UNITED STATES PATENT OFFICE 2,686,208

PRODUCTION OF CYCLO-OLEFINIC COMPOUNDS

Hugh Wilma Boulton Reed, Norton-on-Tees, England, assignor to Imperial Chemical Industries Limited, a corporation of Great Britain No Drawing. Application August 30, 1951, Serial No. 244,459

Claims priority, application Great Britain September 12, 1950

17 Claims. (Cl. 260—666)

This invention relates to the production of olefinic compounds.

It has already been proposed to dimerise butadiene in a thermal non-catalystic process to produce cyclo-octa-1:5-diene together with 4-vinylcyclohex-1-ene. The ratio of cyclo-octa-1:5-diene to 4-vinylcyclohex-1-ene increases with increasing temperature, but, even at 270° C. the weight of cyclo-octa-1:5-diene present in the product is only 12% of the weight of 4-vinylcyclohex-1-ene. The present invention, on the contrary, provides a process in which cyclo-octa-1:5-diene is the major product. More generally, it provides a process for the production of cyclic olefinic compounds, containing at least eight carbon atoms in the ring.

According to the present invention, there is provided an improved process for the production of cyclo-olefinic compounds containing at least eight carbon atoms in the ring, which comprises the step of contacting a conjugated di-olefinic compound in the presence of acetylene with a catalyst derived from nickel carbonyl by the replacement of at least one of the CO groups with a compound of a trivalent element of the group consisting of nitrogen and phosphorus.

A wide range of nickel-containing catalysts may be employed in the process of the present invention. Thus, nickel carbonyl, $Ni(CO)_4$, which has been reacted with a compound such as cyclohexylamine, pyridine, phenylhydrazine, mesidine, triphenylamine or ammonia may be employed. Of the phosphorus-containing compounds, it is possible to use a mono (tri-aryl phosphine) nickel tri-carbonyl, a bis (tri-aryl phosphine) nickel dicarbonyl or a bis (tri-alkyl phosphine) nickel dicarbonyl. The preferred catalyst is, however, bis (triphenyl phosphine) nickel dicarbonyl, since, when this is employed, a higher yield is obtained than with the other catalysts.

The catalysts employed in the present invention may be produced in situ. For example, the requisite amount of nickel carbonyl may be introduced into the reaction vessel together with the calculated quantity of nitrogen or phosphorus compound to give the desired catalyst. Alternatively, when the catalyst is relatively stable, and particularly when it is solid, it is advantageous to prepare it externally, and then to introduce it into the reaction vessel. Thus, bis (triphenyl phosphine) nickel dicarbonyl may be produced by adding two moles of triphenyl phosphine to one mole of nickel carbonyl, $Ni(CO)_4$, and allowing the solid bis (triphenyl phosphine) nickel carbonyl to separate out. This may be removed by filtration or decantation and the required amount introduced into the reaction vessel. This mode of operation has the advantage of allowing the amount of catalyst to be controlled with greater accuracy than when the catalyst is produced in situ.

Suitable starting materials for use in the process of the present invention include butadiene, alkyl derivatives of butadiene such as piperylene, isoprene, 2:3-dimethyl butadiene and hexa-2:4-diene and alkoxy butadienes, such as 1- and 2-methoxy butadiene.

When, for example, butadiene is used as the starting material, the major product, when the catalyst employed is bis (triphenyl phosphine) nickel dicarbonyl, is cyclo-octa--1:5-diene, together with a smaller quantity of 4-vinyl cyclohex-1-ene and a minor amount of cyclododecatriene and other butadiene trimers. These compounds are believed to form from the butadiene present in the reaction vessel, the acetylene present being necessary for reaction, but not appearing in combination in the cyclo-octa-1:5-diene, 4-vinylcyclohex-1-ene and cyclododeca-triene. On the other hand, when using isoprene as the starting material, a product is obtained which comprises methylcyclo-octatriene and this is believed to be formed by reaction between one molecule of isoprene and two molecules of acetylene. These presence of other ring compounds in the products from reactions of this type have been identified, although their separation in a state of high purity is rendered difficult by the complexity of the mixture. For example, 1-vinylcyclodeca-4:8-diene is believed to be formed when using butadiene as the starting material.

The process of the present invention is carried out in the liquid phase, using a solvent such as benzene, toluene or tetrahydrofuran. The catalyst may be added to this solvent together with a small amount of a dehydrating agent and a polymerisation inhibitor. It is highly desirable to carry out the reaction under anhydrous conditions, and in consequence the presence of a dehydrating agent is a valuable precaution. In particular, we have found that calcium carbide is very suitable for this purpose. Other dehydrating agents, such as, for example, ethylene oxide and freshly ignited calcium oxide may be employed. The amount of dehydrating agent used is, suitably, from 0.5 to 2.0 gm. per 100 gms. of material present in the reaction vessel, but, in any case, the amount should be at least sufficient to remove any water present in these materials.

The presence of a minor amout of a polymerisation inhibitor prevents the formation of a deleterious amount of open-chain polymers from the conjugated di-olefinic compound. Inhibitors suitable for use in the process of the present invention include phenolic compounds, such as 2:4-dimethyl-6-tertiary butyl phenol; hydroquinones, or derivatives thereof, quinones, such as 2:5-ditertiarybutyl-1:4-benzoquinone; amines, such as N.N'-di-iso-propyl-p-phenylene diamine. The amount of inhibitor present should be 0.01 to 1% by weight of conjugated diolefine employed, and is conveniently of the order of 0.1% by weight.

After the solvent, catalyst, dehydrating agent and antioxidant have been introduced into the reaction vessel, acetylene may be passed in. It is preferable to operate at an acetylene pressure in excess of atmospheric, and pressures up to 15 atmospheres are suitable; in particular, pressures in the range of 5 to 10 atmospheres are preferred. It is desirable to avoid operation with undiluted acetylene, and it is therefore advantageous to introduce an inert gas, such as nitrogen, into the reaction vessel.

When the acetylene has been introduced, the catalyst may be activated by heating the reaction vessel. In general, the activation process takes place at about 100° C., and, since it is exothermic, the temperature rises. The activation process is not fully understood, but it is believed to involve a reaction between the catalyst and acetylene. When this reaction is finished, the temperature falls again, and it should be maintained within the preferred range of 80 to 150° C., and more preferably between 110–130° C. The conjugated di-olefinic compound may then be added; this addition is preferably carried out slowly. After the addition is complete, the mixture should then be heated for a period of, for example, 2 to 10 hours. During the addition and period of heating the pressure may slowly decrease, and in consequence an amount of acetylene should be introduced from time to time to restore the pressure to its original value. These additions of acetylene may be accompanied by sharp rises in temperature, but, apart from these occasional rises, the temperature should be maintained within the preferred range.

When the reaction is complete, the volatile constituents of the reaction mixture are preferably removed as quickly as possible by vacuum distillation or steam distillation from polymeric material, calcium carbide if present, and catalyst. The volatile constituents are condensed, and the condensate distilled under vacuum in a precision still.

In general, some by-product formation will occur. Thus, polymerization of acetylene may occur with the formation of, for example, benzene, styrene and cuprene.

The compounds prepared by the process of the present invention are useful, for example in the production of derivatives of compounds such as cyclo-octane and cyclo-octene, and for the production of open-chain compounds, such as suberic acid.

*Example 1*

A dry autoclave having a closely fitting glass liner was charged with 173 gm. pure dry benzene, 10 gm. bis (triphenylphosphine) nickel dicarbonyl, 5 gm. calcium carbide and 0.2 gm. 2:5-ditert-butyl-1:4-benzoquinone as inhibitor. After purging 4 times with nitrogen to 10 atmospheres, the mixture was heated under a pressure of 3 atmospheres of nitrogen and 7 atmospheres of acetylene. At 104° C., "activation" of the catalyst occurred, the temperature rising momentarily to 155° C. and quickly falling to 126° C. The addition of 176 gm. of dry butadiene was then commenced and completed in 1½ hours, the charge then being heated at 130° C. for 6 hours longer. Acetylene was added at intervals, 6 times in all, when the pressure fell below about 9 atmospheres to re-establish a pressure of 12 atmospheres. Momentary increases in temperature of about 10° C. occurred with each addition of acetylene. After removal of 26 gm. of unreacted butadiene the solvent and products were removed from polymeric material, catalyst, carbide etc. by rapid distillation in vacuum. Precision distillation of this distillate gave 66 gm. of cyclo-octa-1:5-diene (44% yield on butadiene used) B. P. 95° C./144 mm., 150° C./760 mm., and 15.7 gm. of 4-vinylcyclohexene. (10.5% yield on butadiene used) B. P. 75° C./144 mm., 133° C./760 mm. The residues from 15 such runs were distilled to give a butadiene-trimer cut, 29 gm., B. P. 102-124° C./19 mm. On hydrogenation, in ethyl acetate, hydrogen equivalent to three double bonds was absorbed. Removal of the solvent gave the hydrogenated trimer, from which cyclododecane, M. P. 61° C., 10 gm. was obtained on cooling and filtering.

*Example 2*

The experiment described in Example 1 was repeated but using 42.5 gm. isoprene instead of butadiene and 5 gm. of catalyst. The product was worked up in a similar way, and was found to contain 10 gm. isoprene, 3 gm. styrene, and 3 gm. of a fraction having B. P. 44-46° C. at 10 mm., and a refractive index $n_D^{20}$ 1.5080. This fraction on hydrogenation at atmospheric pressure using reduced platinum oxide as catalyst gave a compound in excellent yield B. P. 162° C. This was shown by infra-red analysis to contain at least 50% of 1-methyl-cyclo-octene. It is concluded from this that the fraction contained an 8-membered ring compound formed from 1 mol. of isoprene, and 2 mols. of acetylene.

I claim:

1. An improved process for the production of cycloolefinic compounds containing at least eight carbon atoms in the ring, which comprises the step of contacting a material selected from the group consisting of conjugated open chain di-olefinic hydrocarbons and alkoxy substituted derivatives thereof in the presence of acetylene at elevated pressure not exceeding 15 atmospheres at a temperature of from 80° to 150° C. with a nickel carbonyl catalyst bearing in lieu of at least one of its CO groups a compound of a trivalent element selected from the group consisting of nitrogen and phosphorus.

2. A process as recited in claim 1 in which the catalyst is selected from the group consisting of mono (tri-aryl phosphine) nickel tricarbonyls, bis (tri-aryl phosphine) nickel dicarbonyls, bis (tri-alkyl phosphine) nickel dicarbonyls.

3. A process as recited in claim 2 in which the catalyst is produced in situ by introducing nickel carbonyl together with a compound of a trivalent element selected from the group consisting of nitrogen and phosphorus into the reaction vessel.

4. A process as recited in claim 2 in which extraneous catalyst is introduced into the reaction vessel.

5. A process as recited in claim 1 in which the di-olefinic compound is butadiene.

6. A process as recited in claim 1 in which the olefinic compound is an alkyl substituted butadiene.

7. A process as recited in claim 1 in which the olefinic compound is an alkoxy substituted butadiene.

8. A process as recited in claim 1 in which the reaction is carried out in the presence of a solvent selected from the group consisting of benzene, toluene and tetrahydrofuran.

9. A process as recited in claim 1 in which the reaction is carried out in the presence of a dehydrating agent in an amount of from 0.5 to 2.0 grams per 100 grams of material in the reaction vessel, said dehydrating agent being selected from the group consisting of calcium carbide, ethylene oxide and freshly ignited calcium oxide.

10. A process as recited in claim 1 in which the reaction is carried out in the presence of a polymerization inhibitor in an amount of from 0.01% to 1.0% by weight of the di-olefin employed, said polymerization inhibitor being selected from the group consisting of alkyl substituted phenols, hydroquinones, quinones and phenyl amines.

11. A process as recited in claim 1 in which an inert gas is also introduced into the reaction vessel.

12. A process as recited in claim 1 in which the pressure is within the range of from 5 to 10 atmospheres.

13. A process as recited in claim 1 in which the temperature is maintained within the range of from 110° to 130° C.

14. A process as recited in claim 1 in which the reaction mixture after the addition of the di-olefin is heated for a period of from 2 to 10 hours.

15. A process as recited in claim 1 in which acetylene is introduced periodically during the heating period to restore the pressure to its original value.

16. A process as recited in claim 1 in which, when the reaction is complete, the volatile constituents of the reaction mixture are quickly removed by vacuum, are condensed and the condensate distilled under vacuum in a precision still.

17. A process as recited in claim 1 in which, when the reaction is complete, the volatile constituents of the reaction mixture are quickly removed by steam distillation, are condensed, and the condensate distilled under vacuum in a precision still.

References Cited in the file of this patent

Ziegler, "Ang. Chem." (1947), vol. 59, page 177.

Foster, "Jour. Am. Chem. Soc.," vol. 70, pp. 2303–05 (1948).

Copenhaver et al., "Acetylene and Carbon Monoxide Chemistry" (1949), pp. 259–265 and 279. Reinhold Publishers, New York.